United States Patent
Hargis et al.

(10) Patent No.: US 8,268,060 B2
(45) Date of Patent: Sep. 18, 2012

(54) DEHUMIDIFIER SYSTEM

(75) Inventors: Larry N. Hargis, Pembroke Pines, FL (US); Robert W. Dibble, Berkeley, CA (US); Stephen D. Heberle, Lake Worth, FL (US)

(73) Assignee: Green Comfort Systems, Inc., Weston, FL (US)

( * ) Notice: Subject to any disclaimer, the term of this patent is extended or adjusted under 35 U.S.C. 154(b) by 954 days.

(21) Appl. No.: 11/974,566

(22) Filed: Oct. 15, 2007

(65) Prior Publication Data

US 2009/0095162 A1    Apr. 16, 2009

(51) Int. Cl.
 *B01D 53/14* (2006.01)
(52) U.S. Cl. ............... 96/234; 96/242; 96/266; 95/159; 95/227; 95/228; 95/231
(58) Field of Classification Search .............. 95/180, 95/209, 227–228, 178–179, 193–194; 96/234, 96/242, 266
See application file for complete search history.

(56) References Cited

U.S. PATENT DOCUMENTS

| | | | | |
|---|---|---|---|---|
| 2,672,024 A | * | 3/1954 | McGrath | 62/94 |
| 2,798,570 A | * | 7/1957 | Kelley | 95/18 |
| 4,691,530 A | * | 9/1987 | Meckler | 62/238.1 |
| 4,941,324 A | * | 7/1990 | Peterson et al. | 62/94 |
| 4,955,205 A | * | 9/1990 | Wilkinson | 62/94 |
| 6,018,954 A | * | 2/2000 | Assaf | 62/94 |
| 6,487,872 B1 | | 12/2002 | Forkosh et al. | |
| 6,494,053 B1 | | 12/2002 | Forkosh et al. | |
| 6,546,746 B2 | * | 4/2003 | Forkosh et al. | 62/271 |
| 6,976,365 B2 | * | 12/2005 | Forkosh et al. | 62/94 |
| 7,306,650 B2 | * | 12/2007 | Slayzak et al. | 95/91 |
| 7,306,654 B2 | * | 12/2007 | King et al. | 95/224 |
| 2004/0112601 A1 | * | 6/2004 | Hache | 166/302 |
| 2009/0114380 A1 | * | 5/2009 | Grabon | 165/181 |

* cited by examiner

*Primary Examiner* — Duane Smith
*Assistant Examiner* — Ives Wu
(74) *Attorney, Agent, or Firm* — Michael E. McKee

(57) ABSTRACT

A dehumidifier system having a dehumidifier section within which liquid desiccant absorbs moisture from air flowing therethrough and a dehumidifier section within which the desiccant is regenerated employs a heat exchanger for maintaining a relatively high temperature differential between the desiccant contained within the dehumidifier and regenerator sections. The desiccant which is conducted to either the dehumidifier section or the regenerator section is separated into multiple streams, and the multiple streams are treated differently from one another before being discharged into preselected segments of the air flow moving through the corresponding one of the dehumidifier section and the regenerator section. A control scheme in the system is capable of altering, and thereby improving, the concentration level of desiccant utilized in the system.

7 Claims, 6 Drawing Sheets

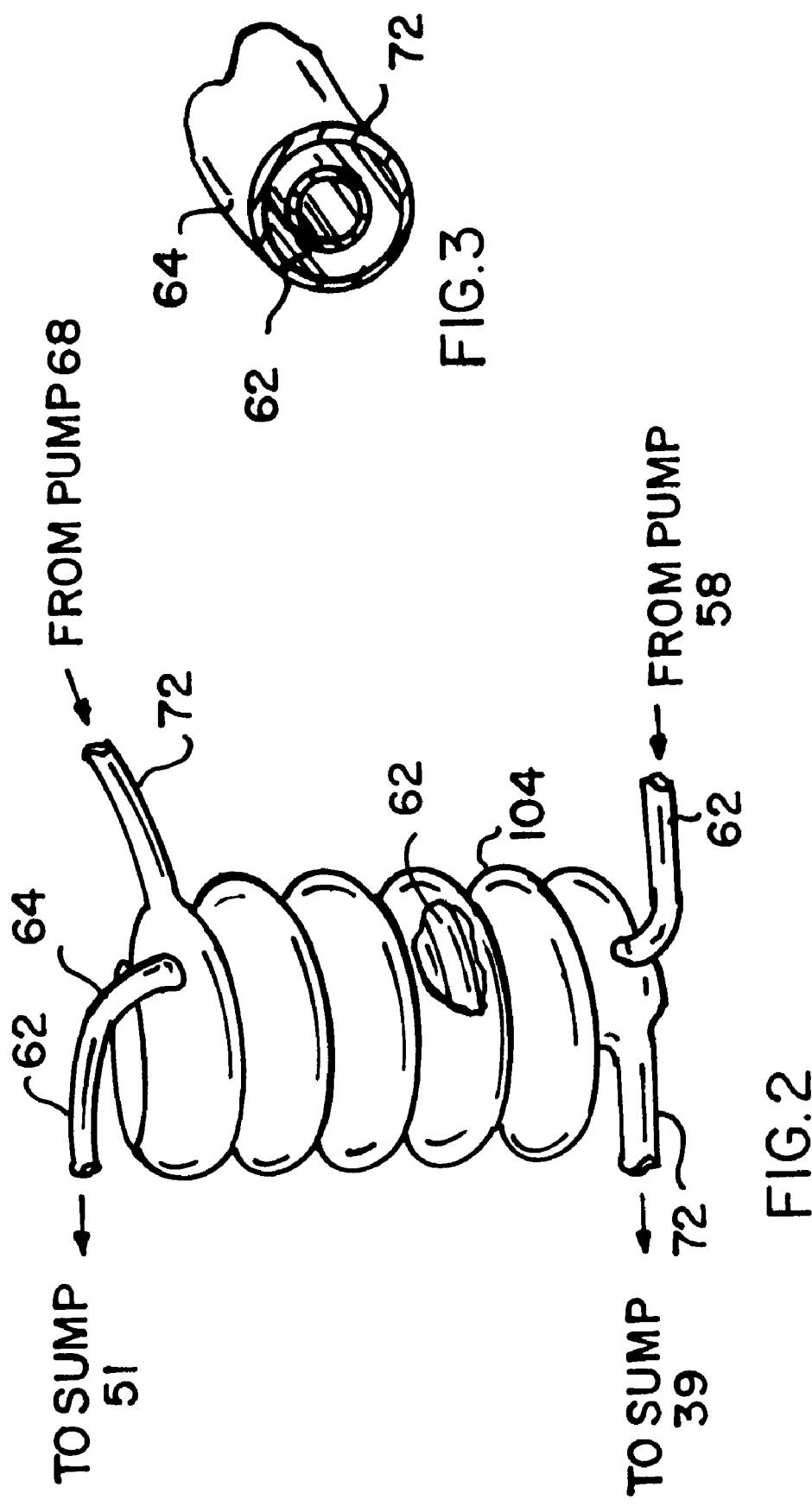

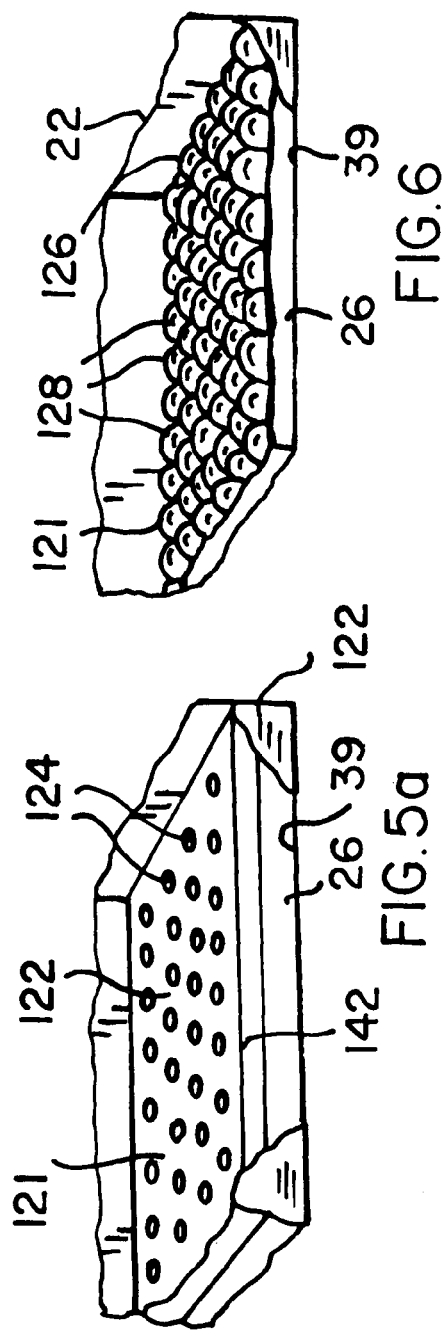

DEHUMIDIFIER SYSTEM

BACKGROUND OF THE INVENTION

This invention relates generally to dehumidifier systems and relates, more particularly, to dehumidifier systems which utilize a desiccant for conditioning air by absorbing moisture from the air.

The class of dehumidifier systems with which this invention is to be compared includes those which include a dehumidifier (i.e. a processing) section, a regenerator section and a desiccant reservoir, or sump, associated with the dehumidifier and regenerator sections. Within the dehumidifier section, a liquid desiccant (e.g. a salt such as LiCl or LiBr dissolved in water) is used to absorb moisture from air (e.g. indoor air) routed through the dehumidifier section so that the air which exits this section contains less moisture than it did when it entered the section. Within the regenerator section, the liquid desiccant is regenerated by inducing the release of moisture which has been previously absorbed by the desiccant in the dehumidifier section into, for example, outside air. It follows that the desiccant can be cycled between the dehumidifier section where moisture is absorbed by the desiccant from the air routed therethrough and the regenerator section where moisture is released from the desiccant in a desiccant-regenerating process.

An example of a dehumidifier system of the aforedescribed class is shown and described in U.S. Pat. Nos. 2,672,024, 6,487,872 and 6,494,053.

It would be desirable to provide a dehumidifier system of the aforedescribed class whose efficiency is enhanced. It would also be desirable to advance the prior art to control the system of this class actively, rather than passively, to greatly expand the operating range (temperature and humidity range) of the system of this class (which has heretofore been severely limited), to dramatically improve part load performance over the entire operating range, to promote system longevity and to provide additional means which enable the system to operate without manual intervention or, in other words, to render the system self-correcting.

Accordingly, it is an object of the present invention to provide a new and improved dehumidifier system whose efficiency is enhanced and whose operating range is expanded with a predetermined treatment of the desiccant as it is transferred between the dehumidifier and regenerator sections of the system.

Another object of the present invention is to provide such a dehumidifier system whose efficiency is enhanced and whose operating range is expanded with a preselected scheme of exposure between the air to be conditioned and the desiccant conducted into the dehumidifier section.

Still another object of the present invention is to provide such a dehumidifier system whose efficiency is enhanced and whose operating range is expanded with a preselected scheme of exposure between outside air and the desiccant delivered to the regenerator section.

Yet another object of the present invention is to provide such a dehumidifier system which is capable of maintaining a desirable temperature differential between the desiccants contained within the corresponding dehumidifier and regenerator sections of the system.

A further object of the present invention is to provide such a dehumidifier system wherein the desiccant which is conducted into the dehumidifier section is separated into multiple streams, the multiple streams of desiccant are treated differently from one another, and then the multiple streams are exposed to a flow of air routed through the dehumidifier section to enhance the efficiency of the system and expand its operating range.

Still another object of the present invention is to provide such a dehumidifier system wherein the desiccant which is delivered to the regenerator section is separated into multiple streams, the multiple streams of desiccant are treated differently from one another, and then the multiple streams are exposed to a flow of outside air routed through the regenerator section to enhance the efficiency of the system and expand its operating range.

Yet another object of the present invention is to provide such a dehumidifier system having an improved capacity to monitor the concentration level of desiccant utilized within the system and thereby provide the capability for an active control scheme versus the passive scheme utilized in some prior art.

One more object of the present invention is to provide such a dehumidifier system having a control scheme which is capable of altering, and thereby improving upon, the concentration level of desiccant utilized within the system and thereby provide the capability for an active control scheme versus the passive scheme utilized in some prior art, plus providing an additional factor for system longevity.

Still one more object of the present invention is to provide such a dehumidifier system which is uncomplicated in structure, yet effective in operation.

SUMMARY OF THE INVENTION

This invention resides in a liquid desiccant-type dehumidifier system including a dehumidifier section having an interior, an air passageway through which air to be dehumidified is routed through the interior of the dehumidifier section, and a sump, and wherein the air passageway of the dehumidifier section has an entrance and an exit between which the air moves in a flow as it is routed through the interior of the dehumidifier section. The system also includes a regenerator section having an interior, an air passageway through which outdoor air is routed through the interior of the regenerator section, and a sump, and wherein the air passageway of the regenerator section has an entrance and an exit between which the air moves in a flow as it is routed through the interior of the regenerator section. The system also includes an amount of liquid desiccant and means for conducting desiccant of the amount into the interior of the dehumidifier section where the conducted desiccant is permitted to absorb moisture from the air routed through the interior of the dehumidifier section and to subsequently collect within the sump of the dehumidifier section and for delivering desiccant of the amount to the regenerator section where the delivered desiccant releases absorbed moisture in a regenerating process and to subsequently collect within the sump of the regenerator section.

In addition, the system includes means for cooling at least a fraction of the desiccant which is conducted into the interior of the dehumidifier section so that the desiccant which is subsequently collected within the sump of the dehumidifier section is in a low-temperature condition and for heating at least a fraction of the desiccant which is delivered to the regenerator section so that the desiccant which is subsequently collected within the sump of the regenerator section is in a high-temperature condition.

In one embodiment of the system, there is provided a heat exchanger through which desiccant from the dehumidifier section is moved in one stream to the regenerator section and through which desiccant from the regenerator section is moved in another stream to the dehumidifier section so that heat is transferred between the one and another streams. Sufficient heat is transferred between the two desiccant streams by way of the heat exchanger so that the temperature of the desiccant of the one stream when exiting the heat exchanger is within about 5 F.° of the temperature of the another stream when entering the heat exchanger and so that the temperature of the desiccant of the another stream when exiting the heat exchanger is within about 5 F.° of the temperature of the desiccant of the one stream when entering the heat exchanger.

In another embodiment of the present invention, there is provided a conduit network through which the desiccant is conducted or delivered into the interior of at least one of the dehumidifier section and the regenerator section in a plurality of desiccant streams. Further still, each of the plurality of desiccant streams are conducted or delivered to a corresponding segment of the flow of air routed between the entrance and exit of the air passageway of at least one of the dehumidifier section and the regenerator section.

In still another embodiment of the system, there is provided a means for monitoring the concentration of desiccant in the solution collected within at least one of the sump associated with the dehumidifier section or the sump associated with the regenerator section. Moreover, the monitoring means includes means for measuring the electrical resistance of the solution and for determining the concentration of desiccant in the solution in accordance to the measured electrical resistance. If desired, the monitoring means can be used to discontinue movement of the air through the dehumidifier system when it is determined that the measured desiccant concentration falls below a predetermined level.

Yet one more embodiment of the invention includes barrier means for substantially separating the upper surface of the desiccant collected within the sump of at least one of the dehumidifier section and the regenerator section from the air disposed within the corresponding dehumidifier section or regenerator section.

BRIEF DESCRIPTION OF THE DRAWINGS

FIG. 2 is a perspective view of a heat exchanger of the FIG. 1 embodiment, shown partly cut-away. It should be noted that alternative forms of liquid-to-liquid heat exchangers are feasible, including brazed plate heat exchangers, as long as they are designed to withstand the corrosive nature of the (desiccant) salt solutions.

FIG. 3 is a radial cross-sectional view of a segment of the heat exchanger of FIG. 2.

FIG. 5a is a fragmentary perspective view of the sump of the dehumidifier section of the FIG. 1 embodiment, shown partly cut-away and illustrating one embodiment of a barrier disposed between the solution collected within the sump and the air disposed within the interior of the dehumidifier section.

FIG. 5b is a fragmentary perspective view of the sump of the regenerator section of the FIG. 1 embodiment, shown partly cut-away and illustrating one embodiment of a barrier disposed between the solution collected within the sump and the air disposed within the interior of the regenerator section.

FIG. 6 is a fragmentary perspective view of the sump of the dehumidifier section of an alternative embodiment of a dehumidifier system, shown partly cut-away and illustrating another embodiment of a barrier disposed between the solution collected within the sump and the air disposed within the interior of the dehumidifier section.

DETAILED DESCRIPTION OF THE ILLUSTRATED EMBODIMENTS

Figure 1:
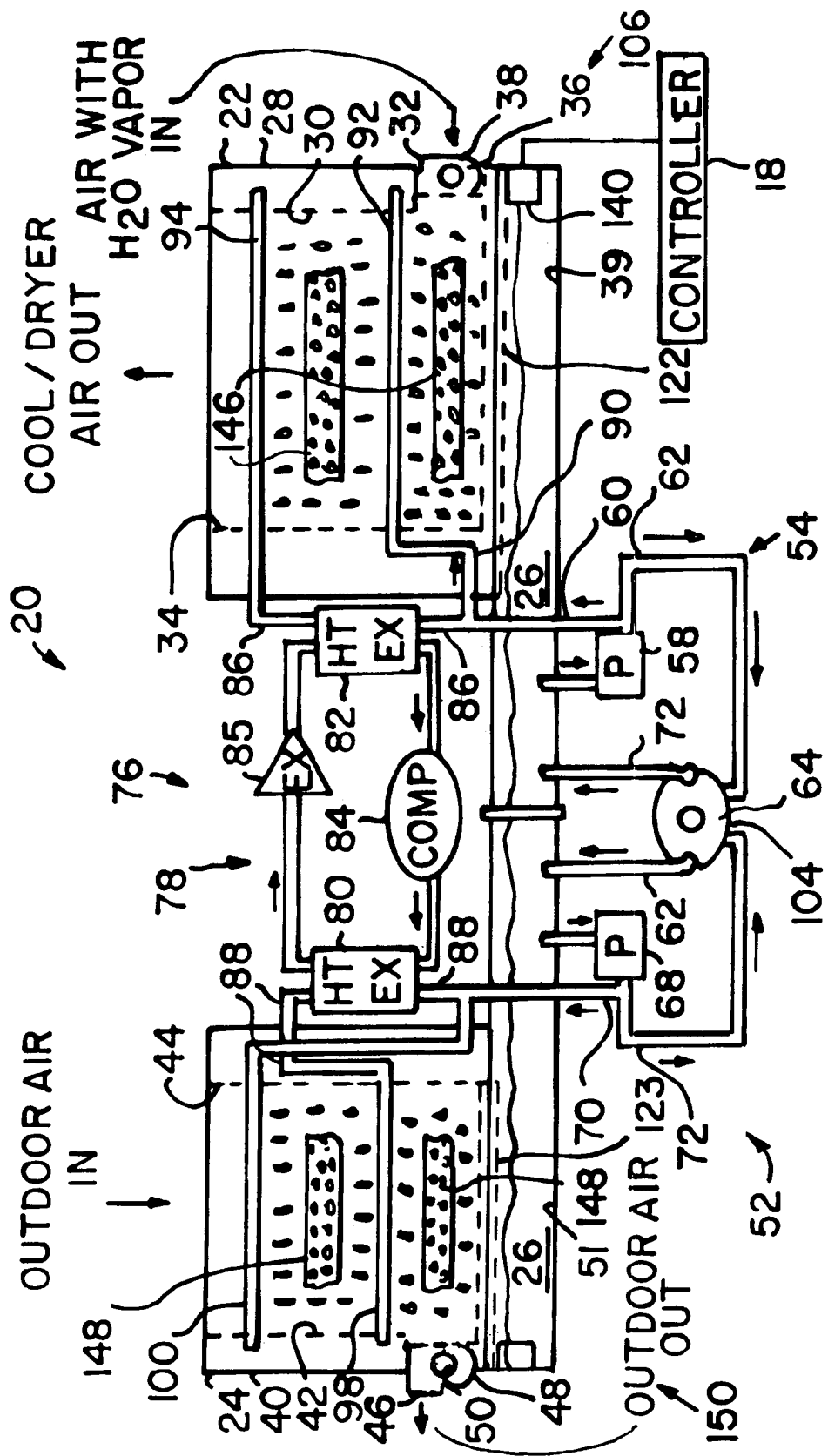
FIG. 1 is a schematic view of an embodiment of the present invention.

Turning now to the drawings in greater detail and considering first FIG. 1, there is illustrated an embodiment, generally indicated 20, of an absorption-type dehumidifier system within which features of the present invention are embodied. The system 20 includes a processing, or dehumidifier, compartment, or section 22, having an interior through which air which is desired to be conditioned (i.e. cooled and dried) is routed and a regenerator compartment, or section 24. An amount of working medium in the form of a liquid desiccant 26 (e.g. a salt such as LiCl or LiBr dissolved in water) is contained within and pumped between the two sections 22 and 24. Examples of liquid desiccants suitable for use in the system 20 include lithium chloride, lithium bromide and glycerin. As is the case with common absorption systems of this class, by exposing air (e.g. indoor air) which is routed through the dehumidifier section 22 to the desiccant 26 conducted therein, moisture (i.e. water vapor) is absorbed from the air by the desiccant 26 (due to the lower vapor pressure of the desiccant 26) and as a consequence, the air is conditioned for comfort purposes.

Following its utilization in the dehumidifier section 22 for absorbing moisture in the air to be conditioned, the desiccant 26 (i.e. in a moisture-laden condition) is pumped to the regenerator section 24 where moisture is released from the desiccant 26 in a regenerating process. Within the depicted system 20, outside air is used as the medium to which the moisture which is given up by the desiccant 26 in the regenerator section 24 is transferred. More specifically and upon release of the previously-absorbed moisture from the desiccant 26 in the regenerator section 24, the desiccant 26 is regenerated and thus returned to a low-moisture condition in preparation for its return to the dehumidifier section 22. It follows that by cycling the desiccant 26 between the interior of the dehumidifier section 22 and the interior of the regenerator section 24, the desiccant 26 of the system can be continually re-used to absorb water vapor from the air which is routed through the dehumidifier section 22 for conditioning purposes.

The system 20 also includes a computer controller 18 (FIGS. 1 and 3) which controls the operation of the dehumidifier system 20. To this end, the controller 18 is connected to the various components of the system 20, described herein, for controlling the actuation and de-actuation of the various system components.

With reference still to FIG. 1, the dehumidifier section 22 of the system 20 is enclosed within a housing 28 defining an air passageway 30 having an air entrance 32 and an air exit 34 and through which air (e.g. indoor air) desired to be conditioned is routed. Adjacent the entrance 32 of the air passageway 30 is mounted a fan 36 and an associated electric motor 38 for moving the air to be conditioned through the air passageway 30. Since the air to be moved through the air passageway 30 of the dehumidifier section 22 is, in the depicted example system 20, indoor air, the entrance end of the fan 36 is disposed in flow communication by way of appropriate ductwork (not shown) with the interior of a structure (e.g. a house or other building) from which the indoor air is to be drawn. Along the same lines and since within the depicted example system 20, the conditioned air is to be returned to the environment from which it was drawn, the exit 34 of the air passageway 30 is disposed in flow communication by way of appropriate ductwork (not shown) with the interior of the structure to which the conditioned air is to be returned. It will be understood, however, that the air for dehumidification or regeneration purposes could be drawn from alternative sources and that air which has been routed through the dehumidifier or regenerator sections 22 or 24 can be thereafter conducted to alternative destinations.

At the base of the dehumidifier section 22 is provided a collection sump 39. During operation of the dehumidifier section 22, desiccant 26 is permitted to cascade downwardly through the interior of the dehumidifier section 22 and in intimate contact with the air flowing through the passageway 30 so that moisture from the air is absorbed by the desiccant 26 which is thereafter gravitationally collected within the sump 39. The exposure of the desiccant 26 to the air flowing through the passageway 30 is enhanced by means of cellulose (or other) media panels 146 (of the class commonly utilized in swamp coolers) mounted within the passageway 30. During use of the system 20, desiccant 26 is discharged onto the panels 146 mounted in the passageway 30 so that the desiccant 26 migrates downwardly through the passageway 30 within the body of the panels 146. It follows that since the desiccant 26 absorbs moisture from the air flowing through the passageway 30, the solution collected within the sump 39 is more dilute due to the water collected.

The regenerator section 24 of the system 20 is also enclosed within a housing 40 defining an air passageway 42 having an air entrance 44 and an air exit 46 and through which air (e.g. outdoor air) into which moisture which has been given up by the desiccant 26 within the regenerator section 24 is moved. Adjacent the exit 46 of the air passageway 42 is mounted a fan 48 and an associated electric motor 50 for moving outdoor air through the air passageway 42 between the entrance 44 and the exit 46 thereof. Since the air to be moved through the air passageway 42 of the regenerator section 24 is, in the depicted system 20, outdoor air, both the entrance 44 and the exit 46 of the air passageway 42 are in flow communication with the outdoor environment.

At the base of the regenerator section 24 is provided a collection sump 51. During operation of the regenerator section 24, desiccant 26 is permitted to cascade downwardly through the interior of the regenerator section 24 and in intimate contact with the outdoor air flowing through the passageway 42 so that air absorbs moisture from the desiccant 26 which is thereafter gravitationally collected within the sump 51. As is the case with the dehumidifier section 22, the regenerator section 24 also includes cellulose panels 148 mounted in the passageway 42 to enhance the exposure of the desiccant 26 discharged into the passageway 42 to the air routed through the passageway 42. It follows that since the desiccant 26 releases moisture into the air flowing through the passageway 42, the solution collected within the sump 51 is more concentrated desiccant 26.

The system 20 also includes conduit means 52 comprising a network, generally indicated 54, of conduits, described herein, through which the desiccant 26 is conducted between the dehumidifier and regenerator sections 22 and 24. In the depicted system 20 and for delivery of desiccant 26 from the sump 39 of the dehumidifier section 22 to the sump 51 of the regenerator section 24, there is mounted a pump 58 whose inlet withdraws desiccant 26 directly from the sump 39, and the conduit network 54 includes a pair of conduits 60 and 62 which are connected to the discharge of the pump 58. One conduit 60 routes desiccant 26 which is discharged from the pump 58 back into the dehumidifier section 22, as is described herein, and the other conduit 62 conducts the remaining portion of the discharge of the pump 58 toward the regenerator section 24. Connected in-line with the conduit 60 is a heat exchanger 64 whose purpose will be apparent herein.

In the depicted system 20 and for delivery of desiccant 26 from the sump 51 of the regenerator section 24 to the sump 39 of the dehumidifier section 22, there is mounted a pump 68 whose inlet withdraws desiccant 26 directly from the sump 51, and the conduit network 54 includes a pair of conduits 70 and 72 which are connected to the discharge of the pump 68. One conduit 70 routes desiccant 26 which is discharged from the pump 68 back into the regenerator section 24, as is described herein, and the other conduit 72 conducts the remaining portion of the discharge of the pump 68 toward the dehumidifier section 22. Connected in-line with the conduit 70 is the aforementioned heat exchanger 64 whose purpose will be apparent herein.

The system 20 also includes means, generally indicated 76, for altering the temperature of the desiccant 26 to either increase the capacity of the desiccant 26 to absorb moisture from air routed through the interior of the dehumidifier section 22 or to increase the ability of the desiccant 26 to release moisture into the air routed through the interior of the regenerator section 24. To this end, the temperature-altering means 76 includes a refrigeration assembly 78 for cooling (at least a fraction of) the desiccant 26 routed into the dehumidifier section 22 and for heating (at least a fraction of) the desiccant 26 routed into the regenerator section 24. Within the depicted system 20, the refrigeration assembly 78 includes a heat exchanger 80 which serves as a condenser for the assembly 78, a heat exchanger 82 which serves as an evaporator for the assembly 78, a compressor 84, an expansion valve 85 and a refrigerant (such as a non-ozone-depleting refrigerant) which is pumped by the compressor 84 in sequence through the heat exchanger 80 (where the refrigerant gives off heat), the expansion valve 85 and the heat exchanger 82 (where the refrigerant absorbs heat). It is preferable that the expansion means 85 be a variable expansion device to expand the operating range of the system and to improve the part load efficiency.

Within the depicted system 20, the heat exchanger 82 is disposed adjacent the dehumidifier section 22 and is arranged in heat exchange relationship with the stream of desiccant 26 which is conducted to the dehumidifier section 22 by way of a conduit 86 so that heat is absorbed by the refrigerant of the assembly 78 from the desiccant 26 which flows through the conduit 86. Thus, within the heat exchanger 82, the stream of desiccant 26 which flows through the conduit 86 is cooled. By comparison, the heat exchanger 80 is disposed adjacent the regenerator section 24 and arranged in heat exchange relationship with the stream of desiccant 26 delivered to the regenerator section 24 by way of a conduit 88 so that the stream of desiccant 26 delivered through the conduit 88 is heated by the refrigerant of the assembly 78.

Since it is known that the capacity of the desiccant 26 to absorb moisture from (indoor) air flowing through the dehumidifier section 22 depends, at least in part, upon the temperature of the desiccant 26 which is exposed to the air, by lowering the temperature of the stream of desiccant 26 conducted into the dehumidifier section 22 through the conduit 86, the capacity of the desiccant stream conducted through the conduit 86 to absorb moisture from the flow of air is increased. It follows that by cooling the desiccant stream conducted by the conduit 86 within the heat exchanger 82 of the refrigeration assembly 78 enhances the capacity of the desiccant stream conducted by the conduit 86 to absorb moisture from the air moving through the interior of the dehumidifier section 22 and consequently increase the efficiency, the operation performance and part load efficiency of the system 20. Conversely, by heating the desiccant stream delivered by the conduit 88 to the regenerator section 24 (i.e. within the heat exchanger 80), the ability of the desiccant stream delivered by the conduit 88 to release its moisture to the (outdoor) air moving through the interior of the regenerator section 24 is enhanced and consequently further increases the efficiency, the operation performance range and part load efficiency of the system 20.

With reference still to FIG. 1, the flow of desiccant 26 (i.e. through the conduit 60) which is conducted from the discharge of the pump 58 back to the dehumidifier section 22 is, within the depicted system 20, bifurcated into a first stream which is conducted through the conduit 86, introduced earlier, and a second stream which is conducted through a conduit 90 before these first and second desiccant stream are discharged back into the dehumidifier section 22. In the depicted system 20, the flow through the conduit 60 is bifurcated by the conduit network 54 so that a portion (e.g. about one-half) of the flow of the conduit 60 is conducted through the conduit 90 and the remainder (e.g. about one-half) of the flow of the conduit 60 is conducted through the conduit 86. It is a feature of the system 20 that these first and second streams (i.e. through the conduits 90 and 86) are handled separately before being directed into separate segments of the flow of indoor air moving through the dehumidifier section 22.

More specifically, the desiccant stream conducted through the conduit 90 is routed (without a pre-cooling treatment) directly to a manifold 92 supported within the air passageway 30 situated adjacent the entrance 32 thereof where the desiccant stream is dispensed from the manifold 92 into the segment of the air flow which moves through the passageway 30 adjacent the entrance 32 thereof. As the desiccant stream which exits the conduit 90 gravitationally migrates, or cascades, through the interior of the dehumidifier section 22 (e.g. by way of the cellulose panels 146) from the manifold 92, the desiccant medium of this stream comes into intimate contact with the entrance segment of the indoor air flow moving through the passageway 30 and absorbs moisture from the air due to the difference in vapor pressure between the desiccant 26 of this desiccant stream and the indoor air.

The other one of the desiccant streams (i.e. the flow through the conduit 86) is routed through the evaporator 82 of the refrigeration assembly 78 where heat is withdrawn from the desiccant stream by the evaporator 82 to cool, and thereby reduce the temperature of, the desiccant stream through the conduit 86, and then this cooled desiccant stream is routed to a manifold 94 supported adjacent the air passageway 30 situated downstream of (e.g. at a location situated about midway along the air flow passageway 30 between the entrance 32 and the exit 34 thereof) where the desiccant stream routed through the conduit 86 is dispensed from the manifold 94 into the segment of the air flow moving through this downstream portion of the air flow passageway 30. As the desiccant stream which exits the manifold 94 gravitationally migrates, or cascades, through the interior of the dehumidifier section 22 (e.g. by way of the cellulose panels 148) from the manifold 94, the desiccant medium of this stream comes into intimate contact with the downstream segment of the air flow moving through the passageway 30 and withdraws moisture from the air due to the difference in vapor pressure between the desiccant 26 of this desiccant stream and the air to which the desiccant is exposed.

It will be understood from the foregoing that the flow of desiccant 26 conducted through the dehumidifier section 22 by way of the conduit 60 is bifurcated into multiple (i.e. two) desiccant streams, and that these two desiccant streams (i.e. the streams routed through the conduits 90 and 86) are handled differently so that the temperatures of the desiccant streams which are ultimately released into the flow of air moving through the passageway 30 of the dehumidifier section 22 are different from one another. Furthermore, the flow of air which moves through the passageway 30 are treated with the multiple (e.g. two) desiccant streams of different temperatures in a multiple (e.g. two) stage operation. In this multiple stage operation, a first, or entrance, segment of the indoor air flow through the passageway 30 is exposed to the untreated (i.e. warmest) stream of desiccant from the conduit 90 before a second, or downstream, segment of the indoor air flow through the passageway 30 is exposed to a treated (i.e. cooler) stream of desiccant from the conduit 86.

The aforedescribed separate handling of the separated (two) desiccant streams (i.e. those flowing through the conduits 86 and 90) and subsequent discharge of the separately-handled streams into separate segments of the flow of air moving through the air passageway 30 of the dehumidifier section 22 results in an increase in the total absorption of moisture from the air moving through the air passageway 30 and hence, an increase in the overall efficiency of and an increased capacity of the system 20. Such benefits are achieved, at least in part, due to the driving forces which exist between the separately-handled desiccant streams routed through the conduits 86 and 90 and the condition of the segments of the flow of air through the interior of the dehumidifier section 22 to which the separately-handled desiccant flows are exposed. Moreover, by directing only a portion, rather than the entirety, of the desiccant flow through the conduit 60 through the evaporator 82 the desiccant stream through the conduit 86 can be cooled to a lower temperature than would be the case if the entirety of the desiccant flow through the conduit 60 were routed through the evaporator 82.

In practice and within the system 20, a substantial amount of moisture is withdrawn from the entrance segment of the indoor air flow moving through the passageway 30 upon exposure to the untreated (i.e. warmer) desiccant stream released into this entrance segment of the indoor air flow from the conduit 90 and manifold 92. However, a great deal of moisture is also withdrawn from the downstream segment of the indoor air flow moving through the passageway 30 upon exposure to the treated (i.e. cooler) desiccant stream released into this downstream segment of the air flow from the conduit 86 and manifold 94. The total amount of moisture collected from the indoor air flow moving through the dehumidifier section 22 of the system 20 is greater than would be collected if the entire flow of desiccant through the conduit 60 were routed through the evaporator 82 and then exposed to both the aforedescribed entrance and downstream segments of the indoor air flow moving through the passageway 30. In other words, any loss in the capacity of the desiccant to absorb moisture from the entrance segment of the indoor air flow moving through the passageway 30 by not cooling the desiccant stream routed through the conduit 90 is more than offset by cooling the desiccant flow through the conduit 86 with the evaporator 82 and then exposing this cooled desiccant stream to the downstream segment of the air flow through the passageway 30. Accordingly, the system 20 is advantageous in this respect.

Rather than bifurcating the desiccant flow routed through the conduit 60 for purposes of directing only a portion of that desiccant stream (i.e. the one routed through the conduit 86) through the evaporator 82 before discharge into the downstream segment of the indoor air flow through the passageway 30, a stream of concentrated and regenerated desiccant could be routed directly from the heat exchanger 64 (i.e. the desiccant flow exiting the conduit 72) to the evaporator 82 where this flow of concentrated desiccant is cooled and then directing this cooled flow of concentrated desiccant into the dehumidifier section 22 for exposure to the downstream segment of the indoor air flow through the passageway 30. This alternative scheme would further improve upon the aforedescribed approach involving the bifurcating of the desiccant flow through the conduit 60 because the cooled desiccant used to absorb moisture in the second, or downstream, segment of the indoor air flow moving through the passageway 30 would be both cooler and more concentrated.

Furthermore and although the desiccant flow routed through the conduit 60 has been described as bifurcated into two streams, the desiccant flow can be separated into an alternative number (e.g. three or more) of streams in accordance with the broader aspects of this invention, and each of the separated streams can be treated differently from one another before being conducted into the dehumidifier section 22 where the separate streams are exposed to the flow of air moving through the passageway 30 therein. Moreover, the bifurcated or separated streams can be treated, e.g. cooled, by means other than the aforedescribed heat exchanger 82. For example, additional compressors or other sources of heating or cooling may be available for this purpose. For instance, cooling tower water can be used in a second stage (split stream for the process side of a thermal air conditioner (TAC), then city water or well water or a ground loop can be used for limited or supplemental cooling of a third stream. Further still, a second compressor circuit could be employed to drive another heat and cooling stage for treatment of separated desiccant streams for processing purposes.

With reference still to FIG. 1, the flow of desiccant 26 (i.e. through the conduit 70) which is conducted from the discharge of the pump 68 back to the regenerator section 24 is bifurcated into one stream which is conducted through the conduit 88, introduced earlier, and another stream which is conducted through a conduit 96 before these first and second desiccant streams are discharged back into the regenerator section 24. In the depicted system 20, the desiccant flow through the conduit 70 is bifurcated by the conduit network 54 so that a portion (e.g. about one-half) of the flow of the conduit 70 is delivered through the conduit 96 and the remainder (e.g. about one-half) of the flow of the conduit 70 is delivered through the conduit 88. It is a feature of the system 20 that these one and another streams are treated separately before being directed into separate segments of the flow of outdoor air moving through the regenerator section 24.

More specifically, the desiccant stream conducted through the conduit 96 is routed (without a pre-heating treatment) directly to a manifold 100 supported within the air passageway 42 situated adjacent the entrance 44 thereof where the desiccant stream is dispensed from the manifold 100 into the segment of the outdoor air flow which moves through the passageway 42 adjacent the entrance 44 thereof. As the desiccant stream which exits the conduit 96 gravitationally migrates, or cascades, through the interior of the dehumidifier section 22 from the manifold 100, the desiccant medium of this stream comes into intimate contact with the entrance segment of the outdoor air flow moving through the passageway 42 and releases moisture into the air due to the difference in vapor pressure between the desiccant 26 of this desiccant stream and the outdoor air.

The other one of the desiccant streams (i.e. the flow through the conduit 88) is routed through the heat exchanger 80 of the refrigeration assembly 78 where heat is transferred from the heat exchanger 80 to the desiccant stream to heat, and thereby elevate the temperature of, the desiccant stream routed through the conduit 88, and then this heated desiccant stream is routed to a manifold 98 supported adjacent the air passageway 42 situated downstream of (e.g. at a location situated about midway along the air flow passageway 42 between the entrance 44 and the exit 46 thereof) where the desiccant stream routed through the conduit 88 is dispensed from the manifold 98 into the segment of the air flow moving through this downstream portion of the air flow passageway 42. As the desiccant stream which exits the manifold 98 gravitationally migrates, or cascades, through the interior of the regenerator section 24 from the manifold 98, the desiccant medium of this stream comes into intimate contact with the downstream segment of the air flow moving through the passageway 32 and releases moisture into the air due to the difference in vapor pressure between the desiccant 26 of this desiccant stream and the outdoor air to which the desiccant is exposed.

It will be understood from the foregoing that the flow of desiccant 26 conducted through the regenerator section 24 by way of the conduit 70 is bifurcated into multiple (i.e. two) desiccant streams, and that these two desiccant streams (i.e. the streams routed through the conduits 96 and 88) are treated differently so that the temperatures of the desiccant streams which are ultimately released into the flow of air moving through the passageway 42 of the regenerator section 24 are different from one another. Furthermore, the flow of air which moves through the passageway 42 are treated with the multiple (e.g. two) desiccant streams of different temperatures in a multiple (e.g. two) stage operation. In this multiple stage operation, a first, or entrance, segment of the outdoor air flow through the passageway 42 is exposed to the untreated (i.e. coolest) stream of desiccant from the conduit 96 before a second, or downstream, segment of the outdoor air flow through the passageway 42 is exposed to a treated (i.e. hotter) stream of desiccant from the conduit 88.

An advantage of the aforedescribed separate treatment of the separated (two) desiccant streams (i.e. those flowing through the conduits 96 and 88) and subsequent discharge of the separately-treated streams into separate segments of the flow of air moving through the air passageway 42 of the regenerator section 24 results in an increase in the total release of moisture by the desiccant directed into the regenerator section 24 and hence, an increase in the overall efficiency of the system 20. Such benefits are achieved, at least in part, due to the driving forces which exist between the separately-treated desiccant streams routed through the conduits 88 and 96 and the condition of the segments of the flow of outdoor air through the interior of the regenerator section 24 to which the separately-treated desiccant flows are exposed. Moreover, by directing only a portion of, rather than the entirety of, the desiccant flow of the conduit 70 through the heat exchanger 80 for heating purposes, the desiccant stream routed through the conduit 88 can be heated to a higher temperature than would be the case if the entirety of the desiccant flow through the conduit 70 were routed through the heat exchanger 80.

In practice and within the system 20, a substantial amount of moisture is released into the entrance segment of the outdoor air flow moving through the passageway 42 upon exposure to the untreated (i.e. cooler) desiccant stream released into this entrance segment of the outdoor air flow from the conduit 96 and manifold 100. However, a great deal of moisture is also released into the downstream segment of the outdoor air flow moving through the passageway 42 upon exposure to the treated (i.e. hotter) desiccant stream released into this downstream segment of the outdoor air flow from the conduit 88 and manifold 98. The total amount of moisture released into the outdoor air flow moving through the regenerator section 24 of the system 20 is greater than would be released if the entire flow of desiccant through the conduit 70 were routed through the heat exchanger 80 and then exposed to both the aforedescribed entrance and downstream segments of the outdoor air flow moving through the passageway 42. In other words, any loss in the capability of the desiccant to release moisture into the entrance segment of the air flow through the passageway 42 by not heating the desiccant flow moving through the conduit 96 is more than offset by heating the desiccant stream routed through the conduit 88 with the heat exchanger 80 and then exposing this heated desiccant stream to the downstream segment of the air flow through the passageway 42. Accordingly, the system 20 is further advantageous in this respect.

Rather than bifurcating the desiccant flow routed through the conduit 70 for purposes of directing only a portion of that desiccant stream (i.e. the one routed through the conduit 88) through the heat exchanger 80 before discharge into the downstream segment of the outdoor air flow through the passageway 42, a stream of moisture-laden desiccant could be routed directly from the heat exchanger 64 (i.e. the desiccant flow exiting the conduit 62) to the heat exchanger 80 where this flow of moisture-laden desiccant is heated and then directing this heated flow of moisture-laden desiccant into the regenerator section 24 for exposure to the downstream segment of the outdoor air flow through the passageway 42. This alternative scheme would further improve upon the aforedescribed approach involving the bifurcating of the desiccant flow through the conduit 70 because the heated desiccant intended to release moisture into the second, or downstream, segment of the outdoor air flow moving through the passageway 42 would be both hotter and more laden with moisture.

Furthermore and although the desiccant flow routed through the conduit 70 has been described as bifurcated into two streams, the desiccant flow can be separated into an alternative number (e.g. three or more) of streams in accordance with the broader aspects of this invention, and each of the separated streams can be treated differently from one another before being conducted into the regenerator section 24 where the separate streams are exposed to the flow of air moving through the passageway 42 therein. Moreover, the bifurcated or separated streams can be treated, e.g. heated, by means other than the aforedescribed heat exchanger 82. For example, additional compressors or other sources of heating or cooling may be available for this purpose. Further still, a second compressor circuit could be employed to drive another heat and cooling stage for treatment of separated desiccant streams for regenerating purposes.

Applicants have also discovered that to further enhance the efficiency of the system 20, it is desirable to effect mass transfer of the desiccant between the dehumidifier section 22 and the regenerator section 24 while transferring relatively little or no heat between the two sections 22 and 24. In other words, while it is desirable to rapidly conduct regenerated, or low-moisture, desiccant from the regenerator section 24 to the dehumidifier section 22 for use of the regenerated desiccant in the dehumidifier section 22 and to rapidly conduct the used, or moisture-laden, desiccant from the dehumidifier section 22 to the regenerator section 24 for regeneration purposes, it is not desirable for the higher temperatures of the desiccant collected within the regenerator section 24 to be transferred to the dehumidifier section 22 or for the lower temperatures of the desiccant collected within the dehumidifier section 22 to be transferred to the regenerator section 24. Thus, applicants' goal here is to achieve similar desiccant concentration levels within the two sumps 39 and 51 through mass transfer between the sumps 39 and 51 while maintaining a relatively large temperature differential between the two sumps 39, 51.

In connection with the foregoing, applicants have determined that the desiccant concentration levels of the solutions contained within the sumps 39 and 51 are sufficiently close to one another when the flow rate of desiccant between the sumps 39 and 51 is at least five times as great as the rate at which moisture is absorbed by the desiccant 26 within the dehumidifier section 22. Such a characterization of the rapidity of the desiccant flow rate between the sumps 39 and 51 in conjunction with the rate at which moisture is absorbed by the desiccant 26 contained within the dehumidifier section 22 accommodates the variation of desiccant flow rates between the sumps of systems having different air-conditioning capacities. For example, the flow rate of desiccant between the sumps of a five-ton conditioning capacity will be larger than the flow rate of desiccant between the sumps of a one-ton conditioning capacity. It follows that such a rapid flow rate of desiccant between the sumps 39 and 51 effectively mixes the desiccant within the sumps 39 and 51, and the pumps 58 and 68 of the system 20 are sized to effect such a rapid flow rate between the sumps 39 and 51.

In further connection with the foregoing, the system 20 utilizes the heat exchanger 64 through which the lower-temperature desiccant which is conducted from the sump 39 of the dehumidifier section 22 toward the regenerator section 24 and the higher-temperature desiccant which is conducted from the sump 51 of the regenerator section 24 toward the dehumidifier section 22 exchange heat with one another. In the depicted system 20 and with reference to FIGS. 2 and 3, the heat exchanger 64 includes a concentric conduit arrangement 104 through which desiccant flows between the sumps 39 and 51 of the respective sections 22 and 24 so that heat is transferred in a counterflow fashion from the desiccant having the higher temperature to the desiccant having the lower temperature. It will be understood, however, that in the broader interests of the present invention, alternative forms of liquid-to-liquid heat exchangers can be employed, including brazed plate heat exchangers, as long as they are designed to withstand the corrosive nature of the (desiccant) salt solutions.

More specifically and within the conduit arrangement 104 of the depicted system 20, the conduit 62 which leads from the pump 58 provides the inner conduit through which the desiccant flows from the dehumidifier section 22 to the regenerator section 24, and the conduit 72 which leads from the pump 68 provides the outer conduit through which desiccant flows from the regenerator section 24 to the dehumidifier section 22. As best shown in FIG. 2, the conduit 62 enters the conduit 72 at an entry point along one side thereof and exits the conduit 62 along one side thereof at a location disposed relatively far downstream of the entry point. The desiccant which exits the heat exchanger 64 through the inner conduit 62 is conducted to the sump 51 of the regenerator section 22, and the desiccant which exits the heat exchanger 64 through the inner conduit 72 is conducted to the sump 39 of the dehumidifier section 22.

Because the desiccant 26 which enters the outer conduit 72 from the regenerator section 24 possesses a higher temperature than the desiccant 26 which enters the inner conduit 62 from the dehumidifier section 22, the desiccant which flows through the inner conduit 62 absorbs heat from the desiccant which flows through outer conduit while the desiccant which flows through the outer conduit 72 is cooled by the desiccant which flows through the inner conduit 62. Moreover, the concentric conduits 62 and 72 are sized (e.g. in length) so that and even though desiccant is transferred (by way of the pumps 58 and 68) between the sumps 39 and 51 at the aforedescribed rapid rate, the temperature of the desiccant which exits the heat exchanger 64 through the inner conduit 62 approaches (e.g. is within about five Fahrenheit degrees of) the temperature of the desiccant which enters the heat exchanger 64 through the outer conduit 72 and so that the temperature of the desiccant which exits the heat exchanger 64 through the outer conduit 72 approaches (e.g. is within about five Fahrenheit degrees of) the temperature of the desiccant which enters the heat exchanger 64 through the inner conduit 62.

Figure 4:
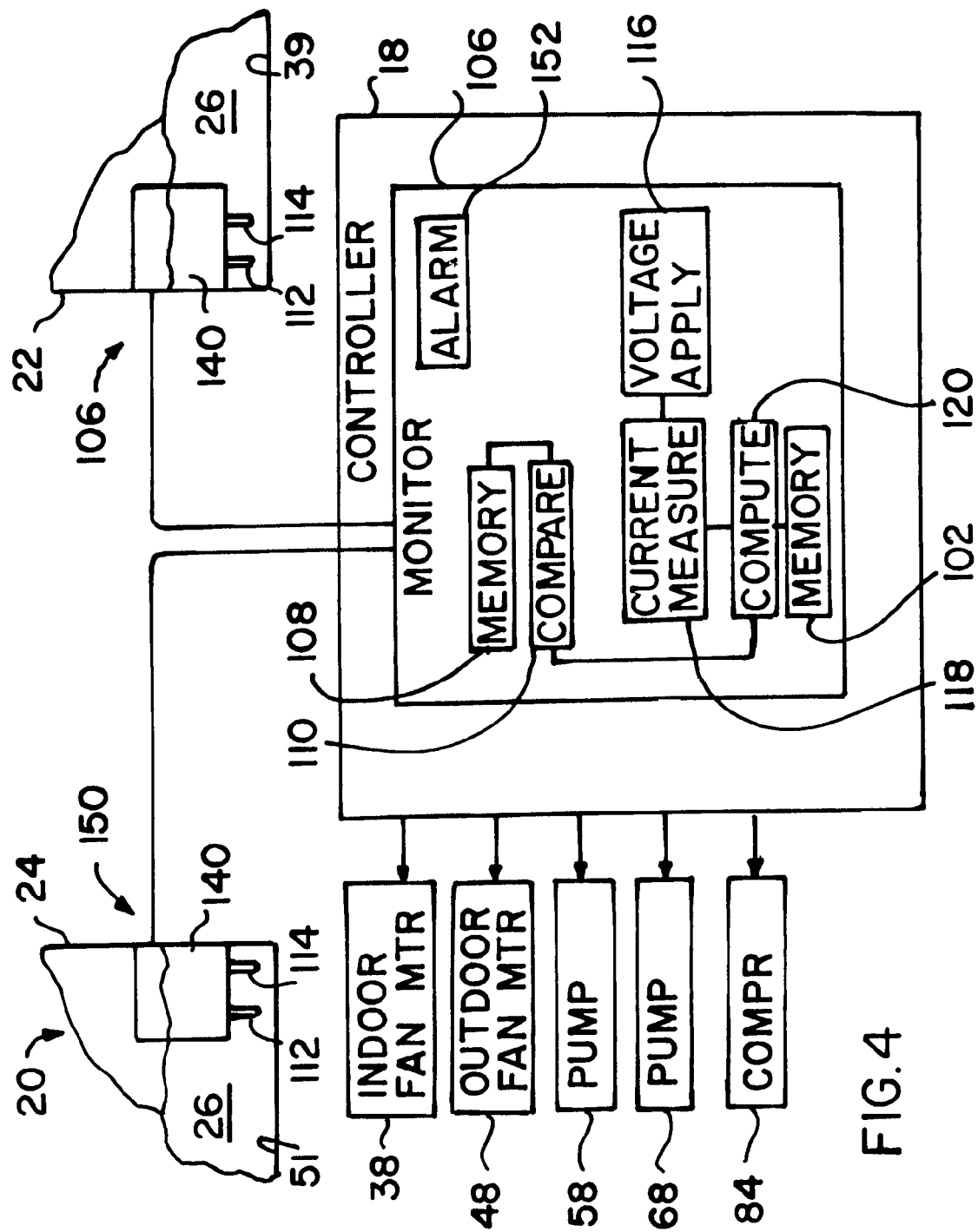
FIG. 4 is a schematic view illustrating in block diagram form the control scheme of FIG. 1 embodiment utilized for monitoring the concentration level of the desiccant-containing solution collected within the sump of the dehumidifier section of the FIG. 1 embodiment.

As mentioned earlier, the operation of the system 20 is controlled by a controller 18 which controls the initiation and shut-off of the various components of the system 20. With reference to FIGS. 1 and 4, the system 20 also includes means, indicated 106, associated with the controller 18 for monitoring the concentration level of desiccant (e.g. the ratio of desiccant content to moisture content) in the solution collected within the sump 39 of the dehumidifier section 22 during system operation and for initiating, upon a lowering of the concentration of the desiccant in the solution of the sump 39 below a preselected value, a sequence of events which increases the concentration level of desiccant in the dehumidifier section 22. In this connection and for a reason which will be apparent herein, there is associated with the system controller 18 memory means 108 containing information relating to a range of desiccant concentration levels which are desired to be maintained in the dehumidifying section 22 (or, more specifically, within the solution collected within the sump 39 of the dehumidifying section 22).

In the depicted system 20, the monitoring means 106 continually monitors the desiccant concentration in the solution of the sump 39 in a manner described herein and generates a signal which corresponds to the actual concentration of desiccant contained within the solution collected within the sump 39. A comparison circuit 110 associated with the memory means 108 receives the signal generated by the monitoring means 106 and compares the actual desiccant concentration of the solution in the sump 39 to the range of acceptable desiccant concentration levels stored within the memory means 108. When the controller 18 determines, by way of the comparison circuit 110, that the desiccant concentration of the sump solution falls outside of, i.e. below, the range of acceptable desiccant concentration levels, the controller 110 de-actuates the indoor fan motor 38 so that no additional indoor air is pulled into the dehumidifier section 22 while the remaining system components, such as the pumps 58, 68, compressor 84 and outdoor fan motor 50, continue operation.

By de-actuating the indoor fan motor 38 under these circumstances, no additional processing (e.g. cooling) of the indoor air is performed so that the desiccant 26 continues to be both regenerated within the regenerator section 24 and is continued to be pumped between the dehumidifier and regenerator sections 22, 24. The result of such a cycling of the system 30 (i.e. without the operation of the indoor fan motor 38) is that regenerated desiccant (i.e. of low-moisture content) begins to accumulate within the sump 39 of the dehumidifier section 22. In other words, by operating the system 20 so that it primarily regenerates, rather than processes and regenerates, the system desiccant 26, the desiccant concentration level of the solution which collects within the sump 39 of the dehumidifier section 22 increases. When a preselected concentration level of desiccant is reached (such as, for example, the lower level of the acceptable range of desiccant concentration levels), as measured by the monitoring means 106, appropriate command signals are generated by the controller 18 to re-initiate operation of the indoor fan motor 38 and thus re-begin the processing of the indoor air.

While the foregoing paragraphs deal with system control for actively controlling the desiccant concentration in the sump 39 of the dehumidifier section 22, it will be understood that this control scheme can be improved upon for controlling the level of the solution collected within the sump of the dehumidifier section. For example, a secondary switch can be mounted within the sump 39 which is activated by a high level condition to effect self-regeneration or, in a worse case scenario, a system shutdown. Similarly, there could be employed a secondary fail safe mechanism which is activated by a low level condition in the event that the concentration control fails or there is a leak or other reason for low solution levels for shutting down the system and thereby preventing the pumps from operating without adequate solution.

The system 20 further includes an additional monitoring means 150 (comparable to the monitoring means 106) associated with the controller 18 for continually monitoring the desiccant concentration in the sump 51 and for initiating a predetermined action, such as the triggering of an alarm, when the desiccant concentration level in the sump 51 falls below a preselected level. In this connection, the monitoring means 150 utilizes several of the aforedescribed components of the controller 110, such as the memory means 108 and comparison circuit 110, for measuring the desiccant concentration level of the solution contained within the sump 51 and comparing the actual concentration level to a range of concentration level.

The advantage provided by the additional monitoring means 150 can be readily appreciated if the regenerator section 24, and hence the sump 51, is disposed outside of a building and hence exposed to the ambient conditions. If, for example, rainfall is inadvertently permitted to seep into the sump 51, the desiccant concentration level of the sump 51 may rapidly drop to an unacceptably low level. By monitoring the desiccant concentration level of the sump 51 and triggering an alarm 152 (FIG. 4) when the concentration level drops below an acceptable level, corrective action can be rapidly initiated.

Although the foregoing paragraphs deal with system control for actively controlling the desiccant concentration in the sump 51 of the regenerator section 24, it will be understood that this control scheme can also be used to control the level of the solution collected within the sump of the regenerator section, as well. For example, a secondary switch can be mounted within the sump 51 which is activated by a high level condition to effect self-regeneration or, in a worse case scenario, a system shutdown. Similarly, there could be employed a secondary fail safe mechanism which is activated by a low level condition in the event that the concentration control fails or there is a leak or other reason for low solution levels for shutting down the system and thereby preventing the pumps from operating without adequate solution.

It is also a feature of the system 20 that its monitoring means 106 or 150 utilizes the electrical conductivity of the solution collected within the sump 39 of the dehumidifier section 22 or the sump 51 of the regenerator section 24 to measure the concentration level of the desiccant 26 in the sump solution. In this connection, applicants have determined that the conductivity of the solution contained within the sump 39 or 51 is a function of the desiccant concentration in the sump solution, and they have incorporated within the monitoring means 106 or 150 a memory circuit 102 which contains pre-programmed information which matches the conductivity of the solution to the desiccant concentration of the solution collected within the sump 39 or 51.

For purposes of measuring the conductivity of the solution collected within the sump 39 or 51 and with reference to FIG. 4, the monitoring means 106 or 150 includes a pair of spaced electrodes 112, 114 which are supported by a body 140 which is, in turn, submerged within the solution collected within the sump 39 or 51 and means, indicated 116, for applying a low AC voltage between the electrodes 112, 114. The current which flows between the electrodes 112, 114 is subsequently measured by an appropriate current-measuring circuit 118 with the monitoring means 108.

A computer 120 associated with the monitoring means 106 or 150 utilizes the voltage, V, applied between the electrodes 112, 114 and the measured current, A, to calculate the resistance, R, to conduction through the solution collected within the sump 39 or 51 according to the equation $R=V/A$. By subsequently using the calculated R value to match the corresponding concentration level in accordance with the pre-programmed information stored within the memory circuit 102, the computer 120 identifies the actual concentration level of desiccant medium in the sump solution with the calculated R value and this identified concentration level is utilized by the comparison circuit 110 for comparison to the acceptable desiccant concentration level stored within the memory circuit 108. As an alternative to continually monitoring the concentration level of the desiccant 26 collected within the solution of the sump 39 or 51, the monitoring means 106 or 150 can be made to gather information relating to the desiccant concentration level in the sump 39 or 51 only at regular and spaced intervals of time (e.g. once every few seconds).

Yet another feature of the system 20 relates to its capacity to conserve the moisture-absorbing capacity of the desiccant 26 collected within the sump 39 of the dehumidifier section 22 and within the sump 51 of the regenerator section 24 while the system 20 is not in operation (e.g. during an OFF cycle of the system 20). In this connection, the system 20 includes a barrier 121 in the form of a first porous shield 122 (FIGS. 1 and 5a) which substantially covers the area of the surface of the desiccant-containing solution collected within the sump 39 of the dehumidifier section 22 and a second porous shield 123 (FIGS. 1 and 5b) which substantially covers the area of the surface of the desiccant-containing solution collected within the sump 51 of the regenerator section 24 so that the desiccant 26 collected within the sumps 39 and 51 is substantially separated from the air which stands within or drifts through the air passageways 30 or 42 of the dehumidifier section 22 or regenerator section 24 during de-activation of the system 20. By maintaining such a separation between the surface of the desiccant-containing solution contained within the sump 39 or 51 and the air which stands within or drifts through the interior of the dehumidifier or regenerator section 22 or 24, very little moisture is absorbed from the air disposed within the desiccant 26 before (or until) the system 20 is cycled back ON.

In the depicted system 20 and as best shown in FIGS. 5a and 5b, each shield 122 or 123 is provided by a relatively thin platen structure 142 supported across and covering the surface of the solution contained within the sump 39 or 51. The shield 122 or 123 can be constructed of a relatively hard, corrosion-resistant plastic which spans the surface of the solution contained within the sump 39 or 51. The shield 122 or 123 of the depicted system 20 possesses a plurality of openings 124 disposed across the surface thereof which permits the passage of desiccant 26 therethrough from the top surface of the shield 122 to the sump 39 or 51 situated beneath the shield 122 or 123. It follows that as the desiccant 26 which is permitted to fall through the dehumidifier or regenerator section 22 or 24 from the manifolds 92, 94 or 98, 100 thereof and strike the upper surface of the shield 122 or 123 is thereafter permitted to flow downwardly into the sump 39 through the shield openings 124.

As an alternative to a porous shield 122 and with reference to FIG. 6, the barrier 121 which substantially separates the surface of the solution collected within the sump 39 or 51 from the air disposed within the system passageway 30 or 42 can be provided by a layer 126 of floatable elements, such as floating plastic spheres 128 (e.g. ping pong balls). Such floatable elements would separate the surface of the desiccant-containing solution collected within the sump 39 or 51 from the air which stands within or drifts through the passageway 30 or 42 yet permit the flow of desiccant which is released into the passageway 30 or 42 downwardly between the floatable elements of the barrier 121 and into the solution contained within the sump 39.

Figure 6B:
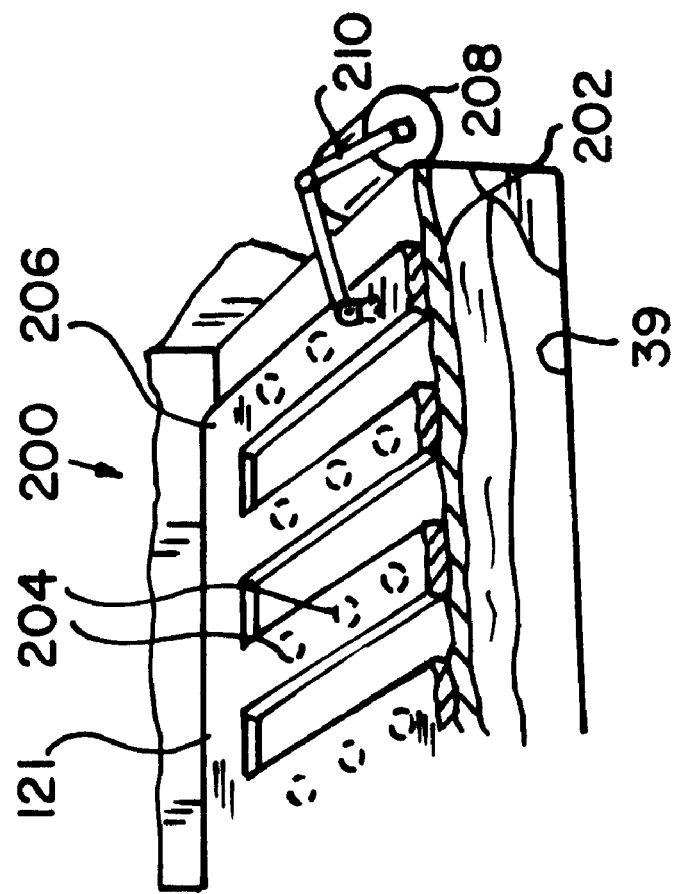
FIGS. 6a and 6b are fragmentary perspective views of the sump of a dehumidifier section of another alternative embodiment of a dehumidifier system, shown partly cut-away and illustrating another embodiment of a barrier disposed between the solution collected within the sump and the air disposed within the interior of the dehumidifier section.
Figure 6A:
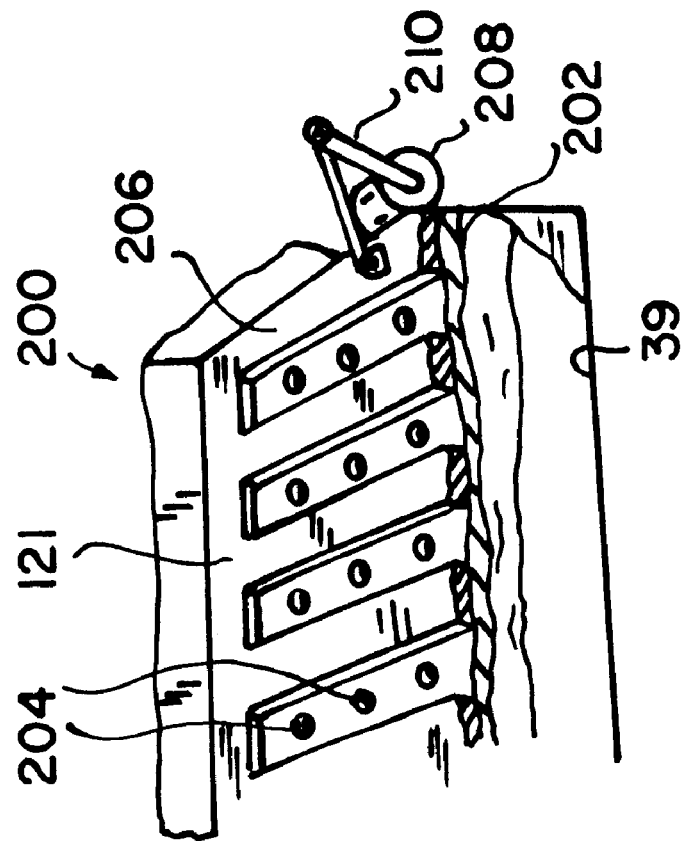

Further still and with reference to FIGS. 6a and 6b, a barrier 121 can be provided by an assembly 200 having a stationary and horizontally-disposed plate 202 having openings 204 disposed thereacross and a movable plate 206 (i.e. a slidable partition) for opening and closing the openings 204 as the plate 206 is slidably moved between alternative positions across the plate 202. A stepping motor 208 can be connected to the plate 206 by way of a suitable linkage arrangement 210 and wired to the controller 18 (FIGS. 1 and 3) so that upon operation of the system 20, the motor 208 positions the movable plate 206 in a position (as shown in FIG. 6a) at which the openings 204 of the stationary plate 202 are uncovered (and thereby providing communication between the solution contained within the underlying sump and the air disposed within the corresponding system passageway 30 or 42) and so that upon de-actuation of the system 20, the motor 208 positions the movable plate 206 in a position (as shown in FIG. 6b) at which the openings 204 of the stationary plate 202 are completely covered and so that no communication is permitted between the solution contained within the underlying sump and the air disposed within the corresponding system passageway 30 or 42. The assembly 200 of FIGS. 6a and 6b may be preferred as a barrier 121 over the aforedescribed porous shield 122 (of FIGS. 5a and 5b) or layer 126 (of FIG. 6) of floatable elements if it is desired to obtain a complete shut-off of communication between the solution contained within the underlying sump and the air disposed within the corresponding system passageway 30 or 42 during system shutdown.

Figure 7:
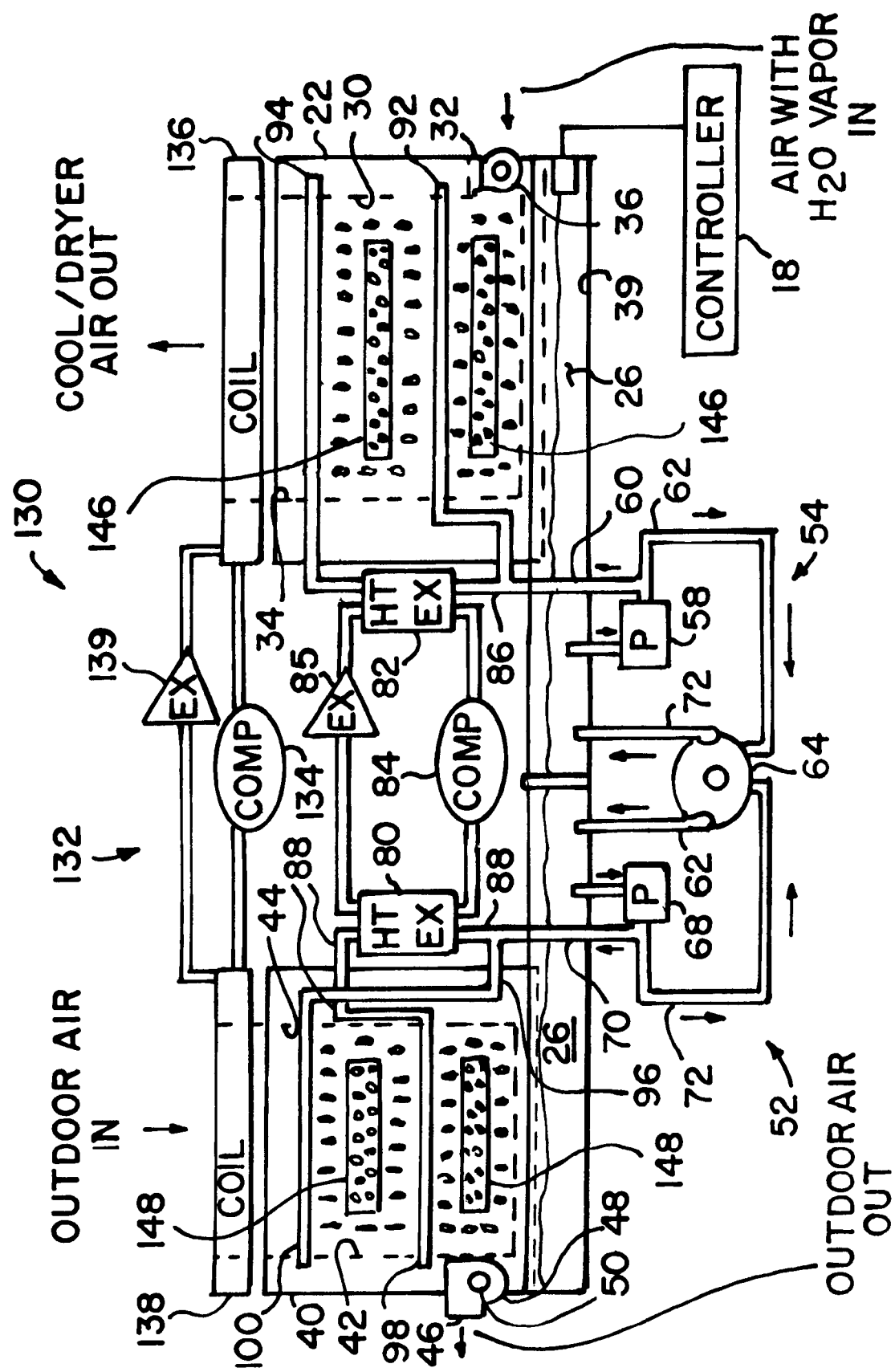
FIG. 7 is a schematic view of a further embodiment of the present invention.

It will be understood that numerous modifications and substitutions can be had to the aforedescribed embodiment 20 without departing from the spirit of the invention. For example, although the aforedescribed embodiment 20 has been shown and described as a system which whose indoor and outdoor air flows are neither cooled or heated by supplemental means, a system in accordance with the broader aspects of this invention may include such supplemental air-cooling or air-heating means. For example, there is illustrated in FIG. 7 a hybrid system 130 having identical components as those used in the system of FIGS. 1-5 (and wherein the identical components bear the same reference numerals), but also includes an air conditioning or refrigeration assembly, generally indicated 132, including a compressor 134, an evaporator coil 136, a condenser coil 138, an expansion valve 139 and an amount of refrigerant which is pumped by the compressor 134 in sequence through the condenser coil 138, through the expansion valve 139 and then through the evaporator coil 136. Within this hybrid system 130, the evaporator coil 136 is supported adjacent the exit 34 of the air passageway 30 leading out of the dehumidifier section 22 so that the air which exits the air passageway 30 after having been conditioned by the removal of moisture from the air by the desiccant 26 released into the interior of the dehumidifier section 22 is cooled further by the evaporator coil 136. Consequently, the conditioned air which ultimately exits the dehumidifier side of the system 130 is cooler than would be the case if air which exits the dehumidifier side of the system 130 were only conditioned by the removal of moisture from the air.

In addition, the condenser coil 138 of the air conditioning assembly 132 is supported adjacent the entrance 44 of the air passageway 42 of the regenerator section 24 so that the air which enters the air passageway 42 is pre-heated by the condenser coil 138. By pre-heating the air which enters the passageway 42, the capacity of the air to hold moisture is increased before it comes into contact with the (moisture-laden) desiccant 26 released into the interior of the regenerator section 24. Upon exposure to the (moisture-laden) desiccant 26 released into the regenerator section 24, the pre-heated air is in a more-favorable condition to absorb the moisture which is released by the (moisture-laden) desiccant 26 conducted through the air passageway 42 of the regenerator section 24.

As an alternative to, or in addition to, pre-heating the air entering the passageway 42 of the regenerator section 24, the (moisture-laden) desiccant 26 which exits the heat exchanger 80 can be further heated by the condenser coil 138 thereby increasing the capacity of the (moisture-laden) desiccant to release vapor to the air conducted through the passageway 42.

Furthermore and although the aforedescribed condenser coil 138 could be a plate fin type heat exchanger for refrigerant-to-air heat exchanger, such a coil could be replaced by a tube-in-tube or other refrigerant-to-liquid heat exchanger to further heat the desiccant flow. It will be understood that limitations, such as limitations on the use of cellulose media in high temperature situations, also apply here, as well, and may dictate that an alternative media (plastic or an inert material) which is not as susceptible to high temperatures be employed. Similar considerations should also be given to the desiccant being used to avoid boiling the desiccant during system operation.

Accordingly, the aforedescribed embodiment 20 is intended for the purpose of illustration and not as limitation.

The invention claimed is:

1. A dehumidifier system comprising:
a dehumidifier section having an interior and an entrance through which air to be dehumidified is routed into the interior of the dehumidifier section, an exit through which air exits the interior of the dehumidifier section and a sump;
a regenerator section having a sump;
an amount of liquid desiccant;
means for conducting a flow of desiccant of the amount into the interior of the dehumidifier section where the conducted desiccant is permitted to absorb moisture from the air routed through the interior of the dehumidifier section and to subsequently collect within the sump of the dehumidifier section and for delivering desiccant of the amount to the regenerator section where the delivered desiccant releases absorbed moisture in a regenerating process and to subsequently collect within the sump of the regenerator section wherein the flow of desiccant conducted into the interior of the dehumidifier section is separated into a first stream and a second stream;
means for treating the first and second streams of conducted desiccant so that upon entry of the first and second streams into the interior of the dehumidifier section, the temperature of the second stream is lower than the temperature of the first stream and of the air which is routed through the interior of the dehumidifier section between the entrance and the exit thereof, the means for treating including means for cooling said second stream of desiccant which is conducted into the interior of the dehumidifier section to thereby lower the temperature of the second stream and so that the desiccant which is subsequently collected within the sump of the dehumidifier section is in a low-temperature condition and
means for heating at least a fraction of the desiccant which is delivered to the regenerator section so that the desiccant which is subsequently collected within the sump of the regenerator section is in a high-temperature condition; and
a heat exchanger through which desiccant from the dehumidifier section is moved in one stream to the regenerator section and through which desiccant from the regenerator section is moved in another stream to the dehumidifier section so that heat is transferred between the one and another streams and so that the temperature of the desiccant of the one stream when exiting the heat exchanger is within about 5 F.° of the temperature of the desiccant of the another stream when entering the heat exchanger and so that the temperature of the desiccant of the another stream when exiting the heat exchanger is within about 5 F.° of the temperature of the temperature of the desiccant of the one stream when entering the heat exchanger; and
the means for conducting includes a conduit network through which the first and second streams are discharged into the interior of the dehumidifier section so that the air which enters the interior of the dehumidifier section is exposed in sequence to the desiccant of the first stream and then to the desiccant of the second stream and to the cooling effects of the second stream before the air exits the dehumidifier section through the exit thereof.

2. The system as defined in claim 1 wherein the heat exchanger includes a first conduit through which the one stream is moved toward the regenerator section and a second conduit through which the another stream is moved toward the dehumidifier section, and the first and second conduits are arranged so that the one and the another streams exchange heat is a counterflow fashion.

3. The system as defined in claim 2 wherein each of the first and second conduits have lengths and the first and second conduits are concentrically arranged along a substantial portion of the lengths thereof.

4. The system as defined in claim 3 wherein a substantial portion of the length of the first conduit is disposed within and extends along a substantial portion of the length of the second conduit.

5. The dehumidifier system as defined in claim 1 wherein each of the one and the another streams of desiccant are moved through the corresponding first and second conduits at a rate which is at least five times as large as the rate at which moisture is absorbed by desiccant in the dehumidifier system.

6. The system as defined in claim 1 wherein
the regenerator section has an interior and an air passageway through which air is routed through the interior of the regenerator section and wherein the air passageway of the regenerator section has an entrance and an exit through which the air moves in a flow as it is routed through the interior of the regenerator section;
the flow of desiccant delivered by the means for delivering is delivered thereby in a flow of delivered desiccant and is separated by the means for delivery into a first stream of delivered desiccant and a second stream of delivered desiccant;
the means for treating includes means for treating the first and second streams of delivered desiccant so that upon entry of the first and second streams of delivered desiccant into the interior of the regenerator section, the temperature of the second stream of delivered desiccant is higher than the temperature of the first stream of delivered desiccant; and
the system further includes
a conduit network associated with the means for delivering through which the first stream of delivered desiccant is discharged into the interior of the regenerator section and so that the air which enters the interior of the dehumidifier section is exposed in sequence to the desiccant of the first stream of delivered desiccant and then to the desiccant of the second stream of delivered desiccant before exiting the dehumidifier section through the exit thereof.

7. A dehumidifier system comprising:
a dehumidifier section and a sump;
a regenerator section having an interior and an air passageway through which air is routed through the interior of the regenerator section and wherein the air passageway of the regenerator section has an entrance and an exit through which the air moves in a flow as it is routed through the interior of the regenerator section and having a sump;
an amount of liquid desiccant;
means for conducting a flow of desiccant of the amount into the interior of the regenerator section where the conducted desiccant releases moisture into the air routed through the interior of the regenerator section and to subsequently collect within the sump of the regenerator section and for delivering desiccant of the amount to the dehumidifier section where the delivered desiccant absorbs moisture in a dehumidifying process and to subsequently collect within the sump of the dehumidifier section and wherein the flow of desiccant conducted into the interior of the regenerator section is separated into a first stream and a second stream;
means for treating the first and second streams of conducted desiccant so that upon entry of the first and second streams into the interior of the regenerator section, the temperature of the second stream is higher than the temperature of the first stream and of the air which is routed through the interior of the regenerator section, the means for treating including means for heating said second stream of desiccant which is conducted into the interior of the regenerator section to thereby raise the temperature of the second stream and so that the desiccant which is subsequently collected within the sump of the regenerator section is in a high-temperature condition and
means for cooling at least a fraction of the desiccant which is delivered to the dehumidifier section so that the desiccant which is subsequently collected within the sump of the dehumidifier section is in a low-temperature condition; and
a heat exchanger through which desiccant from the dehumidifier section is moved in one stream to the regenerator section and through which desiccant from the regenerator section is moved in another stream to the dehumidifier section so that heat is transferred between the one and another streams and so that the temperature of the desiccant of the one stream when exiting the heat exchanger is within about 5 F.° of the temperature of the desiccant of the another stream when entering the heat exchanger and so that the temperature of the desiccant of the another stream when exiting the heat exchanger is within about 5 F.° of the temperature of the temperature of the desiccant of the one stream when entering the heat exchanger; and
the means for conducting includes a conduit network through which the first and second streams of conducted desiccant are discharged into the interior of the regenerator section so that the air which enters the interior of the regenerator section is exposed in sequence to the desiccant of the first stream and then to the desiccant of the second stream to effect the transfer of heat from the second stream to the air before the air exits the regenerator section through the exit thereof.

* * * * *